US008280530B2

(12) United States Patent
Kase

(10) Patent No.: US 8,280,530 B2
(45) Date of Patent: Oct. 2, 2012

(54) PLANT CONTROL SYSTEM

(75) Inventor: Noriko Kase, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 530 days.

(21) Appl. No.: 12/085,804

(22) PCT Filed: Nov. 21, 2006

(86) PCT No.: PCT/JP2006/323243
§ 371 (c)(1),
(2), (4) Date: Nov. 20, 2009

(87) PCT Pub. No.: WO2007/063749
PCT Pub. Date: Jun. 7, 2007

(65) Prior Publication Data
US 2010/0094436 A1    Apr. 15, 2010

(30) Foreign Application Priority Data

Nov. 29, 2005    (JP) .................. P.2005-343099

(51) Int. Cl.
*G05B 11/01* (2006.01)
*G05B 9/02* (2006.01)
*G06F 11/00* (2006.01)

(52) U.S. Cl. ............... 700/21; 700/17; 700/19; 700/79; 702/188; 714/46; 714/57

(58) Field of Classification Search ............... 700/9–11, 700/17, 19, 21, 79; 702/188; 714/1, 25, 714/37, 46, 48, 57
See application file for complete search history.

(56) References Cited

U.S. PATENT DOCUMENTS

| 5,184,122 | A * | 2/1993 | Decious et al. | 340/870.16 |
|---|---|---|---|---|
| 5,970,226 | A * | 10/1999 | Hoy et al. | 714/25 |
| 6,061,809 | A * | 5/2000 | Glaser et al. | 714/11 |
| 6,898,542 | B2 * | 5/2005 | Ott et al. | 702/108 |
| 7,010,450 | B2 * | 3/2006 | Law et al. | 702/108 |
| 7,890,300 | B2 * | 2/2011 | De Groot et al. | 702/188 |
| 2005/0033886 | A1* | 2/2005 | Grittke et al. | 710/107 |
| 2006/0143469 | A1* | 6/2006 | Schmidt et al. | 713/186 |

FOREIGN PATENT DOCUMENTS

| JP | 58-119002 A | 7/1983 |
|---|---|---|
| JP | 11-110006 | 4/1999 |
| JP | 2001-313659 | 11/2001 |
| JP | 2002-236501 A | 8/2002 |
| JP | 2004-178157 | 6/2004 |

OTHER PUBLICATIONS

Japanese Office Action dated Feb. 10, 2011, issued in corresponding Japanese Patent Application No. 2005-343099.

(Continued)

*Primary Examiner* — Crystal J Barnes-Bullock
(74) *Attorney, Agent, or Firm* — Westerman, Hattori, Daniels & Adrian, LLP

(57) ABSTRACT

A plant control system includes: an engineering apparatus for defining change information so as to change definition information about the system; and a control apparatus for referring to the change information downloaded from the engineering apparatus to set an output value of a field device. The control apparatus includes a locking part for inhibiting setting of the output value of the field device.

6 Claims, 3 Drawing Sheets

OTHER PUBLICATIONS

International Search Report (with English translation) mailed Jan. 30, 2007.
International Preliminary Report on Patentability (with English Translation) mailed Jun. 12, 2008.

PCT transmittal forms PCT/IB/308, mailed Apr. 3, 2008.
PCT transmittal forms PCT/IB/326, mailed Jun. 12, 2008.
PCT transmittal forms PCT/IB/338, mailed Jun. 12, 2008.
PCT transmittal forms PCT/IB/373, issued Jun. 3, 2008.

* cited by examiner

PLANT CONTROL SYSTEM

TECHNICAL FIELD

The present invention relates to a plant control system including an engineering apparatus for changing definition information about the system, and a control apparatus for setting an output value to a field device by referring to data change information defined by the engineering apparatus and downloaded from the engineering apparatus.

BACKGROUND ART

A safety control apparatus is known which performs a stop operation of a plant in response to a trip request from the plant at the time of occurrence of abnormality, for safe operation of the plant.

FIG. 3 is a functional block diagram showing one example of a plant control system in which a safety control apparatus is combined with a distributed control apparatus. Reference numeral 1 is a plant as a controlled object, and reference numeral 2 is a control apparatus of the distributed control apparatus and controls a field device of the plant 1.

The control apparatus 2 communicates with a host operation monitoring apparatus 4 through a control bus 3. This operation monitoring apparatus 4 is connected to a global communication bus 5 and can communicate with an external PC 6 through the global communication bus 5.

In the plant 1, reference numeral 7 is a field device, which is a safety-controlled object. Reference numeral 8 is a subsystem field device. In the subsystem field device, a large amount of data is managed particularly among the field devices 7 and field devices (PLC: Programmable Logic Controller, etc.) with relatively low-speed processing are grouped.

Reference numeral 10 is an engineering apparatus for changing definition information about a system, and is connected to the control bus 3. This engineering apparatus 10 is also connected to the global communication bus 5 and can communicate with the operation monitoring apparatus 4 and the external PC 6.

In the engineering apparatus 10, reference numeral 11 is a display part having a man-machine interface function, and includes an input-output module definition window 12 and a subsystem data definition window 13.

Reference numeral 20 is a safety control apparatus connected to the control bus 3. This safety control apparatus 20 communicates with the engineering apparatus 10 through the control bus 3 and also communicates with the subsystem field device 8 and the field device 7 of the plant 1 and performs trip processing for performing a stop operation of the plant in response to a trip request from the plant 1.

In the safety control apparatus 20, reference numeral 21 is a function block, and sets output values to an input-output module 22 and a subsystem communication input-output module 23. The input-output module 22 and the subsystem communication input-output module 23 set the output values received from the function block 21 to the field device 7 and the subsystem field device 8.

Reference numeral 24 is an input-output module information holding part, and change information inputted from the input-output module definition window 12 of the engineering apparatus 10 is downloaded and is held in the input-output module information holding part 24. Here, input-output module information means information in which a relation among the function block 21, the input-output module 22 and the field device 7 is defined.

Reference numeral 25 is a subsystem data information holding part, which is handled by the subsystem communication input-output module 23, and change information inputted from the subsystem data definition window 13 of the engineering apparatus 10 is downloaded and is held in the subsystem data information holding part 25.

The function block 21 refers to the change information held in the input-output module information holding part 24 and the subsystem data information holding part 25, and then determines and sets output values to the input-output module 22 and the subsystem communication input-output module 23.

A control system for setting a parameter value to a field device is described in Patent Reference 1.
See Patent Reference 1: JP-A-11-110006

DISCLOSURE OF THE INVENTION

Problems that the Invention is to Solve

In the input-output module 22 for mainly handling a contact output, an analog output, etc., a type or the number of handling data is fixed and a change in input-output module definition is simple, for example, addition or deletion of a card (in the card, information about a field device is reflected and held) of the inside of the input-output module 22. As a result of that, a CPU can access the card immediately after the contents of the input-output module definition are reflected in a system.

On the other hand, in the subsystem communication input-output module 23 for communicating with the subsystem field device 8, the number of handling data is larger than that of the input-output module 22 for handling the contact output etc. and a user can define a type or the number of data. In this case, it is requested to change these definitions without stopping a plant.

However, the subsystem communication input-output module 23 exchanges data with the subsystem field device 8 by Recommended Standard (RS) communication etc. Therefore, it takes a long time to update data when the amount of data is large. As a result of that, there is a problem that continuity of data is not ensured. For example, erroneous data in which updating is not completed is referred or set in the case of accessing the card immediately after the contents of the definition change are reflected in the system.

The present invention has been made in order to solve the above-described problem, and provides a plant control system for ensuring continuity of a plant and ensuring access to an input-output module which cannot be accessed immediately after a changed definition is reflected in the system in an on-line change of definition information.

Means for Solving the Problems

A plant control system includes: an engineering apparatus for defining change information so as to change definition information about the system; and a control apparatus for referring to the change information downloaded from the engineering apparatus to set an output value of a field device, wherein the control apparatus comprises a locking part for inhibiting setting of the output value of the field device.

In the plant control system, the engineering apparatus comprises a display part for displaying a locking window for performing a locking operation on the locking part.

In the plant control system, the control apparatus and the field device comprise a tracking communication part for referring to the change information and checking a present value of a change destination to perform tracking.

In the plant control system, the control apparatus notifies the locking window of completion of the tracking.

In the plant control system, the control apparatus notifies the locking part of completion of the tracking.

In the plant control system, the control apparatus is a safety control apparatus for performing a stop operation of a plant with respect to a trip request from the plant.

In the plant control system, a field device comprising the tracking communication part is a subsystem field device.

Effect of the Invention (1) By combining locking with tracking, an error output to a field device can be prevented at the time of changing data definition of a subsystem.

(2) Since continuity of data in which definition is changed is ensured, the definition can be changed without stopping a plant and thus operation efficiency can be increased.

DESCRIPTION OF REFERENCE NUMERALS AND SIGNS

1 PLANT
2 CONTROL APPARATUS
3 CONTROL BUS
4 OPERATION MONITORING APPARATUS
5 GLOBAL COMMUNICATION BUS
6 EXTERNAL PC
7 FIELD DEVICE
100 ENGINEERING APPARATUS
101 DISPLAY PART
102 INPUT-OUTPUT MODULE DEFINITION WINDOW
103 SUBSYSTEM DATA DEFINITION WINDOW
104 LOCKING WINDOW
200 SAFETY CONTROL APPARATUS
201 FUNCTION BLOCK
202 INPUT-OUTPUT MODULE
204 INPUT-OUTPUT MODULE INFORMATION HOLDING PART
205 SUBSYSTEM DATA INFORMATION HOLDING PART
206 LOCKING PART
207 SUBSYSTEM COMMUNICATION INPUT-OUTPUT MODULE
207a TRACKING COMMUNICATION PART
300 SUBSYSTEM FIELD DEVICE
300a TRACKING COMMUNICATION PART

BEST MODE FOR CARRYING OUT THE INVENTION

Figure 1:
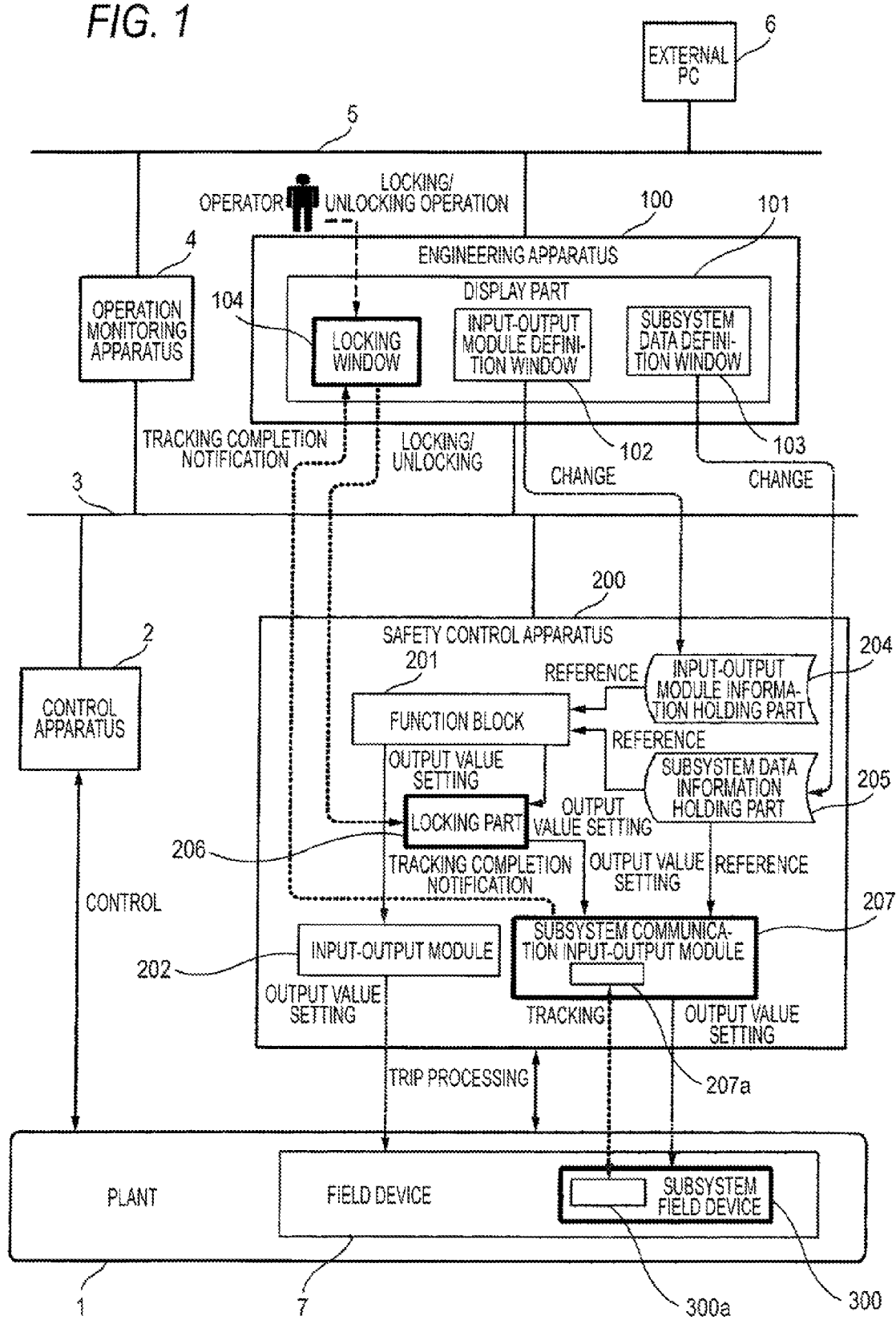
FIG. 1 is a functional block diagram showing one embodiment of a plant control system to which the present invention is applied in combination with a distributed control apparatus.
Figure 3:
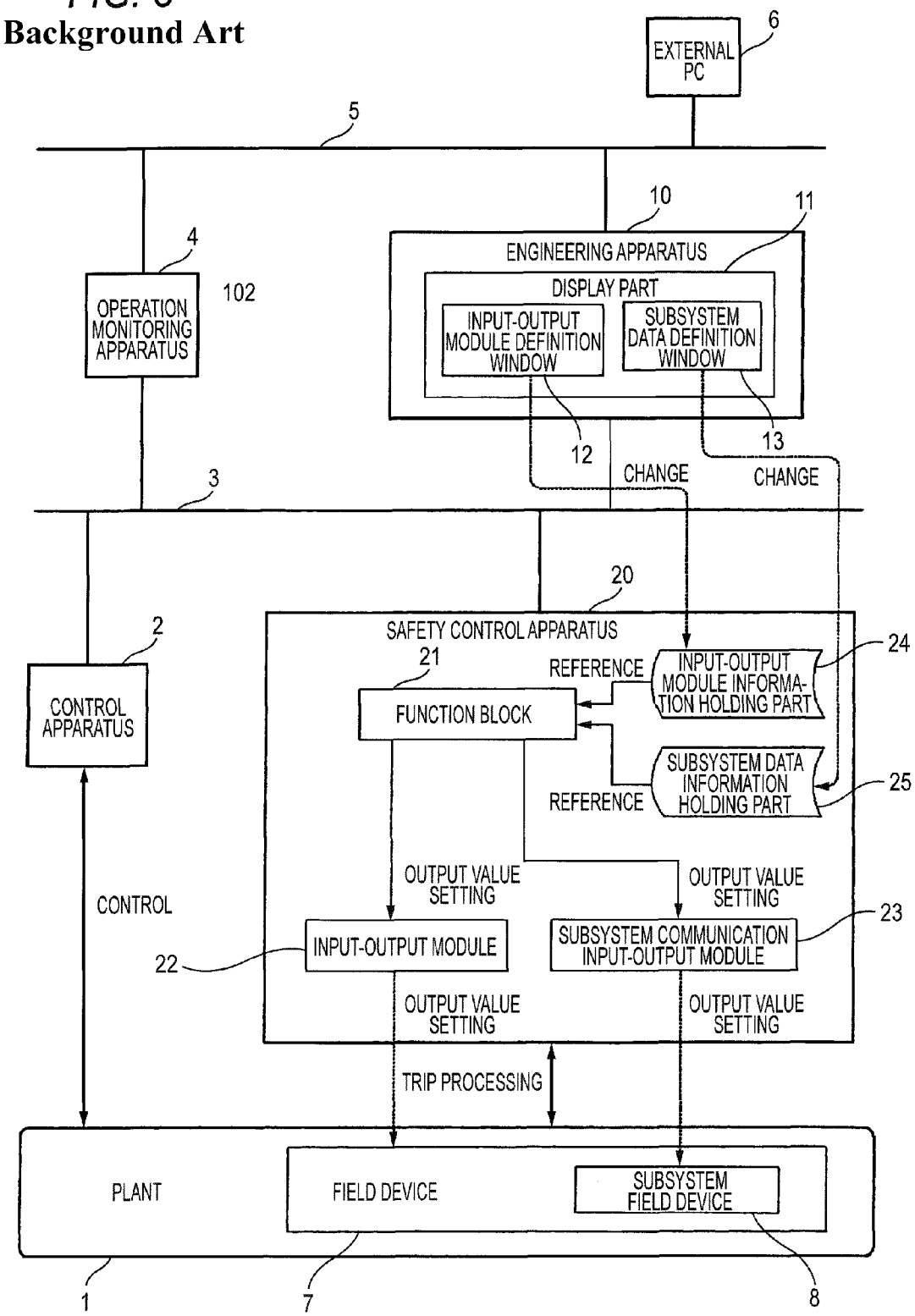
FIG. 3 is a functional block diagram showing one example of a plant control system in combination with a distributed control apparatus.

The present invention will be described in detail by the drawings hereinafter. FIG. 1 is a functional block diagram showing one embodiment of a plant control system to which the present invention is applied in combination with a distributed control apparatus. The description is omitted by assigning the same numerals to the same elements as those of the system described in FIG. 3. Characterizing portions of the present invention will be described hereinafter.

Reference numeral 100 is an engineering apparatus. A display part 101 having a man-machine interface function includes an input-output module definition window 102 and a subsystem data definition window 103 with the same functions as those of the above-described system. The engineering apparatus 100 includes a locking window 104 in addition to these windows.

Reference numeral 200 is a safety control apparatus, and includes a function block 201, an input-output module 202, an input-output module information holding part 204 and a subsystem data information holding part 205 with the same functions as those of the above-described system. The safety control apparatus 200 includes a locking part 206 and a subsystem communication input-output module 207 having a tracking communication part 207a in addition to these elements.

Reference numeral 300 is a subsystem field device. The subsystem field device 300 further includes a tracking communication part 300a for communicating with the tracking communication part 207a of the subsystem communication input-output module 207 as compared with the subsystem field device 8 of the above described system.

The locking part 206 is inserted into the middle of an output value setting path from the function block 201 to the subsystem communication input-output module 207, and output value setting to the subsystem communication input-output module 207 is inhibited in a locked state and the output value setting is performed in an unlocked state.

Locking/unlocking operations of the locking part 206 are performed by manual operations of an operator via the locking window 104 of the engineering apparatus 100 for communicating with this locking part 206.

Next, a procedure of tracking processing performed between the tracking communication part 207a of the subsystem communication input-output module 207 and the tracking communication part 300a of the subsystem field device 300 will be described.

(1) An operator operates the locking part 206 to be in a locked state via the locking window 104, and inhibits output value setting from the function block 201 to the subsystem communication input-output module 207.

(2) The subsystem communication input-output module 207 refers to a data value, a type and a kind of data targeted for change from the subsystem data information holding part 205, then sequentially calls the present values of data information referred with respect to the tracking communication part 300a of the subsystem field device 300 from the tracking communication part 207a, and then allows the present values to be held in a card of the subsystem communication input-output module 207.

(3) The tracking processing ends at a point of completing the calling of the present values of the referred data information. The locking window 104 is notified of tracking completion notification from the subsystem communication input-output module 207. The operator checks the completion of tracking, and performs an unlocking operation on the locking part 206.

(4) By this unlocking operation, the contents of the card of the inside of the subsystem communication input-output module 207 in which the present value is reflected by tracking are rewritten by change information by an output value which reflects the contents of change and is passed from the function block 201 to the locking part 206.

Figure 2:
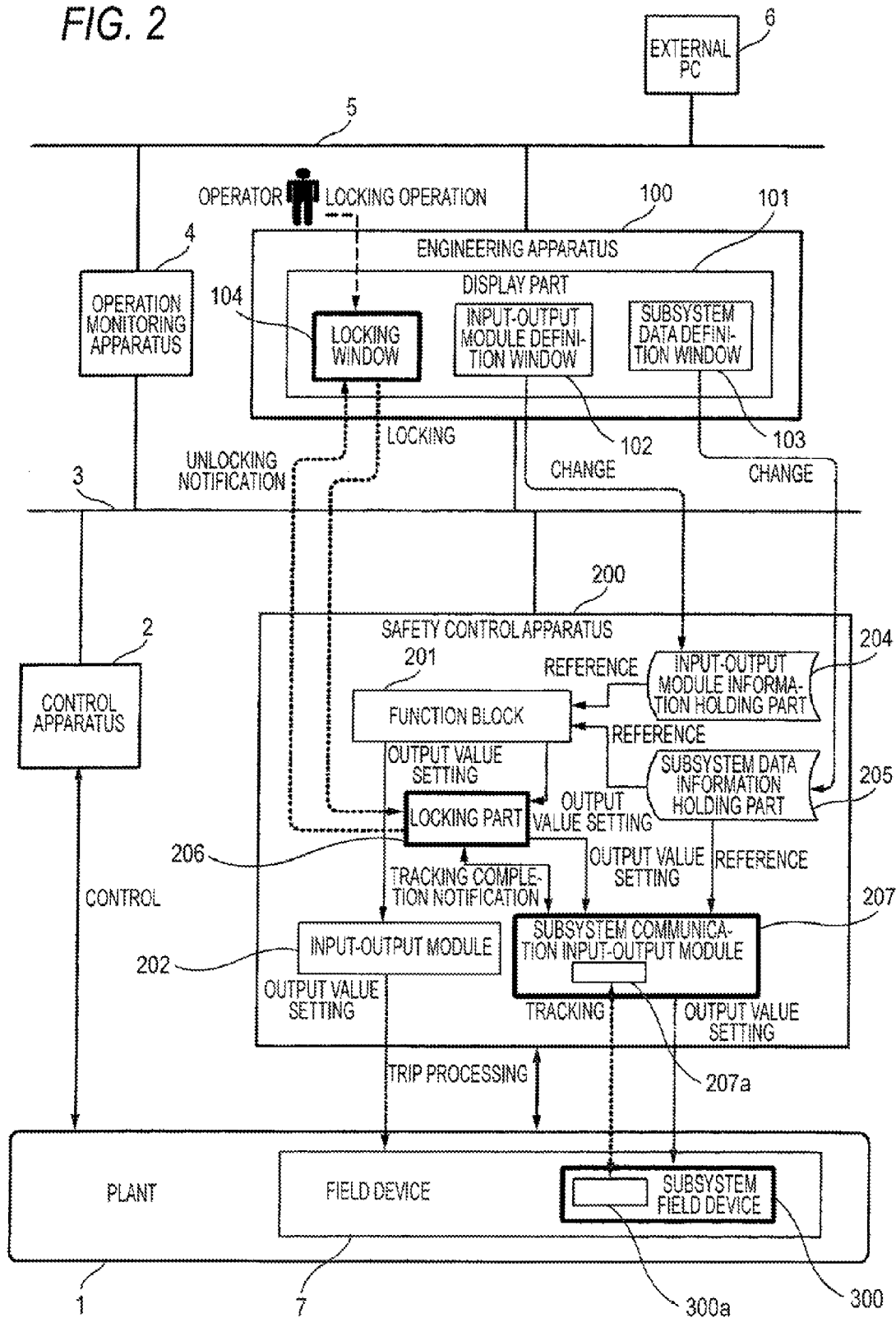
FIG. 2 is a functional block diagram showing another embodiment of the present invention.

FIG. 2 is a functional block diagram showing another embodiment of the present invention. The embodiment of FIG. 2 differs from the embodiment of FIG. 1 in that a locking part 206 is notified of tracking completion notification from a subsystem communication input-output module 207 and then the locking part 206 automatically shifts its own locked state to an unlocked state and then returns unlocking notification to a locking window 104. In this configuration, an operator performs only a locking operation on the locking window 104.

According to the above described embodiments, while the present invention is applied to the safety control apparatus 200, it can also be applied to definition change processing from the engineering apparatus (not shown) to the control apparatus 2 in a distributed control apparatus. The present application is based on Japanese patent application No. 2005-343099 filed on Nov. 29, 2005, the contents of which are hereby incorporated by reference.

The invention claimed is:

1. A plant control system comprising:
    an engineering apparatus for defining change information so as to change definition information about the system; and
    a control apparatus for referring to the change information downloaded from the engineering apparatus to set an output value of a field device,
    wherein the control apparatus comprises a locking part for inhibiting setting of the output value of the field device, and
    wherein the control apparatus and the field device comprise a tracking communication part for referring to the change information and checking a present value of a change destination to perform tracking.

2. The plant control system of claim 1, wherein the engineering apparatus comprises a display part for displaying a locking window for performing a locking operation on the locking part.

3. The plant control system of claim 1, wherein the control apparatus notifies the locking window of completion of the tracking.

4. The plant control system of claim 1, wherein the control apparatus notifies the locking part of completion of the tracking.

5. The plant control system of claim 1,
    wherein the control apparatus is a safety control apparatus for performing a stop operation of a plant with respect to a trip request from the plant.

6. The plant control system of claim 5, wherein the field device comprising the tracking communication part is a subsystem field device.

* * * * *